United States Patent [19]

Ho

[11] Patent Number: 5,065,989
[45] Date of Patent: Nov. 19, 1991

[54] WORKTABLE

[76] Inventor: Cheng W. Ho, 12-2 Alley 1, Lane 437, Sec. 2, Pader Road, Taipei, Taiwan

[21] Appl. No.: 532,917

[22] Filed: Jun. 4, 1990

[51] Int. Cl.⁵ ............................................. B25B 1/22
[52] U.S. Cl. .................................. 269/139; 269/901; 403/317
[58] Field of Search .............. 269/136, 139, 219, 220, 269/258, 901; 403/315, 316, 317

[56] References Cited

U.S. PATENT DOCUMENTS

| | | | |
|---|---|---|---|
| 4,154,435 | 5/1979 | Alessio | 269/139 |
| 4,184,667 | 1/1980 | Alessio | 269/139 |
| 4,378,107 | 3/1983 | Wagster et al. | 269/901 |
| 4,406,374 | 9/1983 | Yedor | 403/317 |
| 4,586,842 | 5/1986 | Puccinelli | 403/317 |

*Primary Examiner*—J. J. Hartman
*Attorney, Agent, or Firm*—Ostrolenk, Faber, Gerb & Soffen

[57] ABSTRACT

A workable comprises two pairs of legs, a tabletop, and a pair of support arms. The top end of each pair of legs is pivotally joined by a joint means which further pivotally connects a receiving frame of the tabletop at its upper portion. Each of the receiving frame is provided with a pair of fixtures, the distance between the two fixtures is adjustable by a threaded rod disposed inside the receiving rod. Each of the support arms is pivotally connected to the receiving frame at its top end while its lower end is provided with a pair of dents permitting it to be supported on the forward extended legs by engaging the dents with a locating pin on the legs. When detaching the support arm from the locating pin on the legs, the legs may be folded toward each other and the tabletop may be lifted to form an upright position while closely attach the folded legs. Each of the fixtures included an upper part and a lower part, the lower part is positioned on the receiving frame while the upper part is pivotally connected to the lower part and allow a top board connected thereon to form a upright position when the upper part is sidewardly turned relative to the lower part.

2 Claims, 5 Drawing Sheets

WORKTABLE

BACKGROUND OF THE INVENTION

The present invention relates to a worktable, particularly to a worktable having a vertically foldable tabletop for easy and convenient folding.

Most worktables are formed with fixed dimensions, and the article to be fabricated is tightly fastened to the tabletop by clamping means thereon to facilitate the proceeding of work. Worktables with fixed dimensions occupy a very large storage space and are not convenient in either carriage or storage, and consequently, can not meet the requirements of portability nor can they be easily moved to a storage room when they are not in use.

There is a kind of folding worktable designed to have a set of telescopic tubes or foldable linkage provided between two pairs of table legs, the worktable may be folded to reduce its volume before it is stored by upward lifting its one pair of legs while matching the folding action of the telescopic tubes or of the linkage. However, such folding worktable involves too many complicated parts which are difficult in manufacturing and assembly, expensive in production cost, and inconvenient in use. Consequently, it can not be accepted by most users.

It is therefore tried by the applicant to develop a worktable which can overcome and eliminate the drawbacks in the conventional worktables and greatly improve the practicability of worktables.

SUMMARY OF THE INVENTION

It is the primary object of the present invention to provide a worktable which includes two pairs of legs which are able to be folded toward each other, and a tabletop with one end pivotally connected to a support arm while the other end may be independently swung.

It is another object of the present invention to provide a worktable, the tabletop of which includes one pair of fixtures which are movable in relation to each other and can be disposed either in a level position or in a vertical position for clamping or fixing article to be fabricated.

Other objects and advantages of the present invention may become apparent when referring to the following description and accompanying drawings wherein:

DETAILED DESCRIPTION OF THE INVENTION

Figure 1:
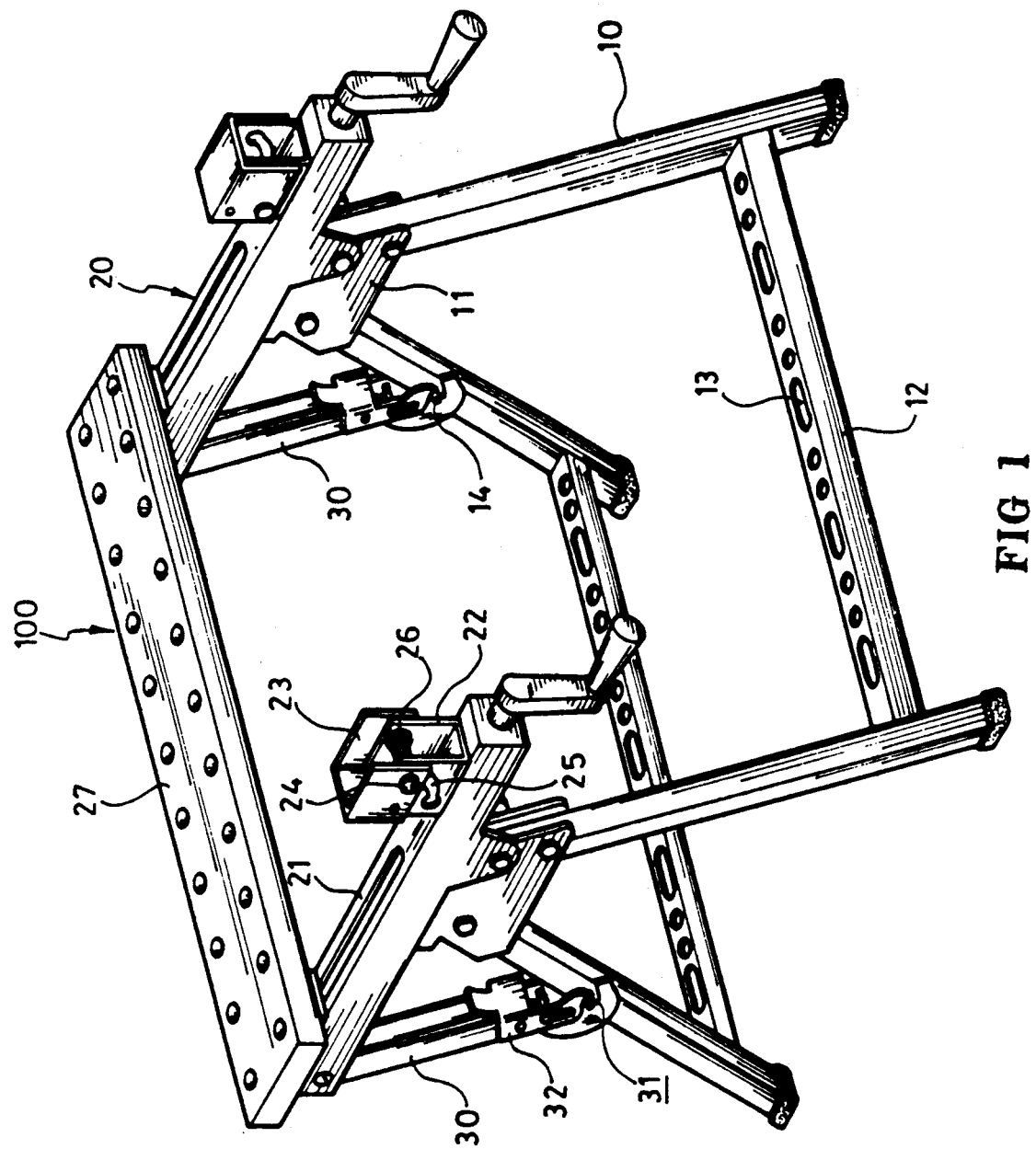
FIG. 1 is a three-dimensional perspective of the invention showing the legs in an extended position, one of the top boards fixed to the fixtures being shown removed to more clearly illustrate the way the fixtures is uprightly disposed for clamping an article to be fabricated.

Please refer to FIG. 1. Worktable 100 of the invention includes two pairs of legs 10, a tabletop 20, and one pair of support arms 30. A joint means 11 is used on each pair of legs 10 to pivotally join the same at their top end while it also pivotally joining a receiving frame 21 of the tabletop 20. Two tool racks 12 may be transversely provided between two pairs of legs 10, one for each two legs 10, and openings with different shapes are formed on each tool rack 12 for positioning tools (not shown) so that they can be accessed easily whenever they are needed.

Figure 2:
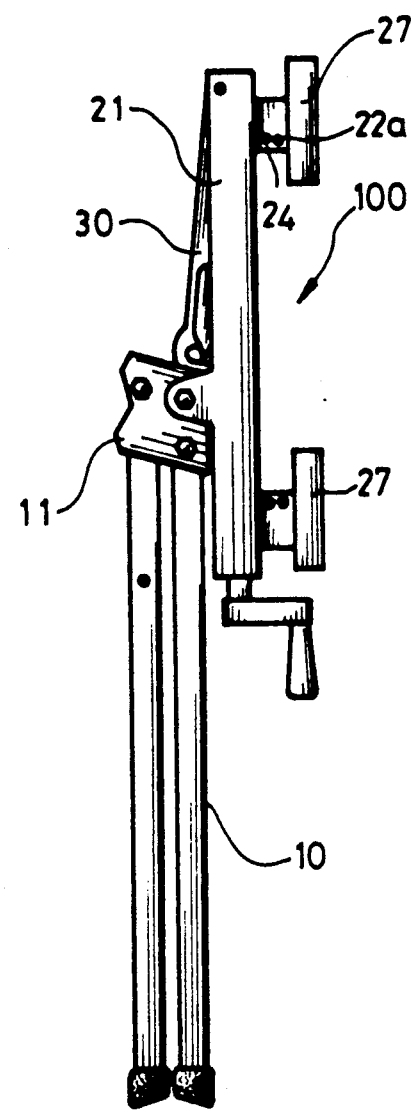
FIG. 2 is a side view showing a worktable of the invention in a folded position.
Figure 3:
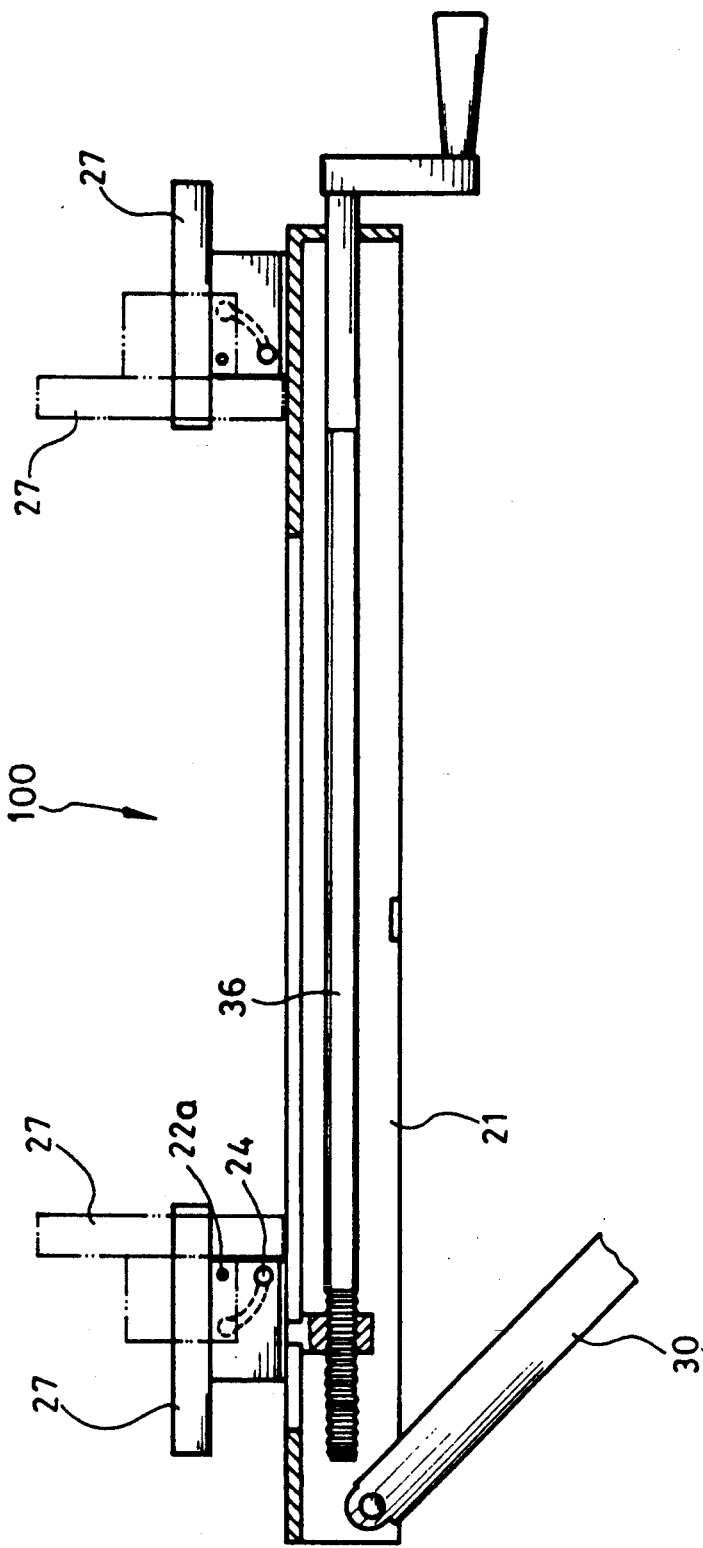
FIG. 3 is a fragmentary side view showing a pair of fixtures changed from a level position to an upright position.

The tabletop 20 includes two receiving frames 21. On each of the receiving frames 21, a pair of spaced apart fixtures are as in FIGS. 1, 2 and 3 provided for joining respective top boards 27 on each fixture. A threaded rod 36 is installed inside each of the receiving frames 21 with a crank rocker 37 provided outside the working end of each receiving frame 21, so that it can be used to adjust the distance between the two fixtures to fitly and tightly clamp the article to be fabricated between the fixtures and the top boards 27. Since the above-mentioned structure is similar to that of a conventional worktable, it is not described in any detail herein.

Figure 4:
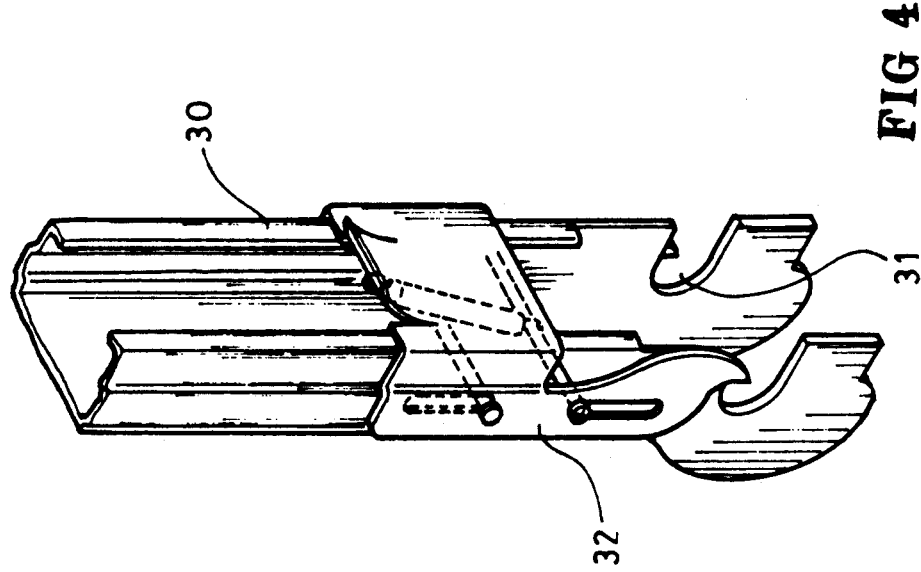
FIG. 4 is a three-dimensional perspective showing a support arm in detail.

The worktable 100 of the present invention is characterized by including the two support arms 30 and by being provided with two clamp-manner-changeable fixtures. Each support arm 30 is pivotally connected to the underside of the front end of the receiving frame 21 at its upper end as shown in FIG. 3, while its bottom end in FIG. 4 is provided with a pair of slots or dents 31 and also with a slidable fixing means 32. The dents 31 may fitly receive a locating pin 14 provided on the leg 10 that extends forwardly while the fixing means 32 helps to lock the locating pin 14 in the dents 31 by being moved between two different positions which can open or close the dents 31 separately. In this way, the support arms 30 are firmly but detachably supported on the two forward extending legs 10 to allow the tabletop 20 to keep a horizontal position.

Figure 5:
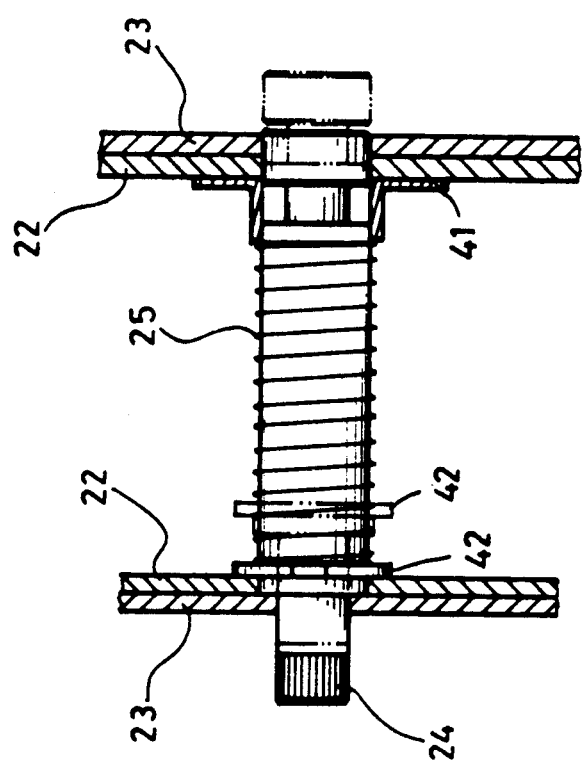
FIG. 5 shows the manner in which the retaining pin in the fixtures is operated.

When the fixing means 32 is moved to its open position, the dents 31 may be separated from the locating pin 14, and, consequently, from the legs 10, which allows the legs 10 as well as the tabletop 20 to be folded in a vertical direction. As shown in FIGS. 1 and 5, each of the fixtures consists of an upper part 23 and a lower part 22 at first 22d, the upper part 23 is pivotally connected to the lower part 22 while the latter is disposed on the receiving frame 21. The upper part 23 is provided with a retaining pin 24 which transversely passes the lower part 22 through a guiding slot 25 formed thereon and the pin 24 in the slot 25, is contained. The retaining pin 24 has a spring 26 supported thereon which at one end presses against the tubular element 41 which in turn is pressed against the lower part 22 and which at the other end presses against the larger diameter end 42 of the retaining pin 24. This action of the spring 26 retains the retaining pin 24 at either end of the guiding slot 25, so that the top board 27 fixed on top of the upper part 23 may be positioned in either a level or an upright manner and facilitates the clamping of articles of different sizes by the lower part 22 or the top board 27.

Please further refer to FIG. 2. When folding the worktable 100, just detach the bottom end of the support arms 30 from the locating pin 14 and, consequently the legs 10, at this point, the tabletop 20 may be lifted uprightly and the two pairs of legs 10 are allowed to be folded toward each other while two pairs of folded legs 10 are allowed to contact the ground at the same time. By this way, the space occupied by the folded worktable 100 is minimized and can be conveniently handled.

We claim:

1. A worktable, comprising:

a tabletop comprising a pair of fixture receiving frames extending generally parallel, each frame having opposite ends and a center between its ends;

two pairs of legs for support the tabletop, the legs having top and bottom ends, the leg top ends of one of the legs of each pair of legs being pivotally connected to the tabletop generally toward the center of a respective one of the frames between the ends of that frame, the one leg being pivotable to selectively move the one leg to a support position of the legs wherein the bottom ends of the legs of each pair are separated and to a folded position of the legs wherein the bottom ends of the legs of each pair are toward each other; the frames being connected with the respective leg pairs such that the tabletop can be lifted upright while the leg pairs are in the folded position;

a respective pair of fixtures on each frame, and means in each frame for adjusting the distance between the fixtures on that frame for enabling the clamping of an article between the fixtures on that frame;

a support arm having an upper end which is pivotally connected to one end of one frame at a location spaced away from the pivot connection of the respective one leg to the one frame, the support arm having a lower end with a dent formed therein;

a pin formed on the one leg at the one frame and the pin being placed for being received in the dent of the support arm, and such reception of the pin in the dent fixing the legs in their supporting position and fixing the one leg against pivoting to the legs folded position, while separation of the pin from the dent in the support arm frees the one leg to pivot to the legs folded position; slidable fixing means on the support arm, the fixing means being slidable from a position opening the dent for permitting the locating pin on the leg to move in and out of the dent to a closed position for locking the pin in the dent;

each fixture comprising a lower part connected to the top of the respective frame and an upper part pivotally connected to the lower part at a pivot connection for enabling the upper part to be pivoted from a first orientation to a second orientation perpendicular to the first orientation;

the tabletop further comprising a respective top board attached at a location on each fixture upper part such that pivoting of the fixture upper part moves the board between a flat, generally horizontal orientation and an upright, generally vertical orientation;

the upper and lower fixture parts each respectively comprising two spaced apart sides, a retaining pin defined on at least one side of the upper part, at least one side of the lower part having a pivot guide slot defined therein, the sides of the upper part being respectively placed outward of the respective sides of the lower part, the retaining pin of the upper part extending from the side of the upper part through the guide slot in the side of the lower part;

a spring on the retaining pin, means on the retaining pin for being engaged by the spring and those means being biased outwardly by the spring into engagement with at least one side of the lower part for restraining movement of the retaining pin along the guide slot, thereby for restraining pivoting of the upper part with respect to the lower part;

the pivot connection between the upper and lower parts being spaced from the retaining pin and the guide slot, the guide slot being curved to permit pivoting of the retaining pin along with the pivoting of the upper part.

2. The worktable of claim 1, wherein the means for adjusting the distance between the respective pair of fixtures on one of the frames comprises a threaded rod in the frame which is connected to one of the fixtures such that rotation of the rod moves the one fixture with respect to the other fixture on the frame.

* * * * *